(12) United States Patent
Kim

(10) Patent No.: US 11,095,747 B2
(45) Date of Patent: Aug. 17, 2021

(54) METHOD AND APPARATUS FOR RECEIVING RESPONSE INFORMATION IN M2M SYSTEM

(71) Applicant: SAMSUNG ELECTRONICS CO., LTD., Suwon-si (KR)

(72) Inventor: Sangeon Kim, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 98 days.

(21) Appl. No.: 15/743,270

(22) PCT Filed: Jul. 6, 2016

(86) PCT No.: PCT/KR2016/007326
§ 371 (c)(1),
(2) Date: Jan. 9, 2018

(87) PCT Pub. No.: WO2017/007239
PCT Pub. Date: Jan. 12, 2017

(65) Prior Publication Data
US 2018/0205804 A1 Jul. 19, 2018

(30) Foreign Application Priority Data

Jul. 9, 2015 (KR) .................. 10-2015-0097960
Jul. 29, 2015 (KR) .................. 10-2015-0107329
Jul. 6, 2016 (KR) .................. 10-2016-0085554

(51) Int. Cl.
*H04L 29/08* (2006.01)
*H04L 12/54* (2013.01)
(Continued)

(52) U.S. Cl.
CPC .......... *H04L 67/32* (2013.01); *H04L 12/5601* (2013.01); *H04L 49/3081* (2013.01);
(Continued)

(58) Field of Classification Search
CPC . H04L 67/32; H04L 49/3081; H04L 12/5601; H04L 2012/5665; H04L 2012/5679; H04W 4/70
See application file for complete search history.

(56) References Cited

U.S. PATENT DOCUMENTS 8,868,092 B2 * 10/2014 Lee .................. H04W 4/14
455/452.1
8,891,424 B2 11/2014 Park et al.
(Continued)

FOREIGN PATENT DOCUMENTS

KR  10-2012-0138619 A  12/2012
WO  2015/069038 A1     5/2015

*Primary Examiner* — Soe Hlaing
(74) *Attorney, Agent, or Firm* — Sughrue Mion, PLLC

(57) ABSTRACT

Provided is a procedure for receiving response information in response to a request message in an M2M system. Such a procedure may include transmitting a request message; determining a response type parameter corresponding to the request message; and receiving response information according to the response type parameter, wherein one of blocking, synchronous non-blocking (nonBlockingRequestSynch) and asynchronous non-blocking (nonBlockingRequestAsynch) is set as the response type parameter.

7 Claims, 9 Drawing Sheets

(51) Int. Cl.
    *H04L 12/935*     (2013.01)
    *H04W 4/70*       (2018.01)
    *H04L 12/70*      (2013.01)

(52) U.S. Cl.
    CPC ....... *H04W 4/70* (2018.02); *H04L 2012/5665* (2013.01); *H04L 2012/5679* (2013.01)

(56) References Cited

U.S. PATENT DOCUMENTS

| | | |
|---|---|---|
| 8,929,339 B2 | 1/2015 | Park et al. |
| 2014/0073367 A1 | 3/2014 | Chou |
| 2016/0234691 A1* | 8/2016 | Jeong ..................... H04W 4/70 |
| 2017/0099562 A1* | 4/2017 | Bhalla .................... H04L 67/16 |

* cited by examiner

FIG. 6

*<content parameter information >*

```xml
<xs:element name="request">
 <xs:complexType>
  <xs:complexContent>
   <!-- Inherit common attributes -->
   <xs:extension base="m2m:regularResource">
    <xs:sequence>
     <!-- Common Attribute, specific to <container>, <contentInstance>
       <request> and <delivery> resources -->
     <xs:element name="stateTag" type="xs:nonNegativeInteger" />
     <!-- Resource Specific Attributes -->
     <xs:element name="operation" type="m2m:operation" />
     <xs:element name="target" type="xs:anyURI" />
     <xs:element name="originator" type="m2m:ID" />
     <xs:element name="requestID" type="m2m:requestID" />
     <xs:element name="metaInformation" type="m2m:metaInformation" />
     <xs:element name="content" type="m2m:primitiveContent" />
     <xs:element name="requestStatus" type="m2m:requestStatus" />
     <xs:element name="operationResult" type="m2m:operationResult" />

<!-- Child Resources -->
     <xs:choice minOccurs="0" maxOccurs="1">
      <xs:element name="childResource" type="m2m:childResourceRef"
        minOccurs="1" maxOccurs="unbounded" />
      <xs:choice minOccurs="1" maxOccurs="unbounded">
       <xs:element ref="m2m:subscription"></xs:element>
      </xs:choice>
     </xs:choice>
    </xs:sequence>
   </xs:extension>
  </xs:complexContent>
 </xs:complexType>
</xs:element>
```

FIG. 7

<operationResult attribute information>

```
<xs:complexType name="operationResult">
 <xs:sequence>
  <xs:element name="content" type="m2m:primitiveContent" minOccurs="0" />
  <xs:element name="eventCategory" type="m2m:eventCat" minOccurs="0" />
  <xs:element name="from" type="m2m:ID" minOccurs="0" />
  <xs:element name="originatingTimestamp" type="m2m:timestamp" minOccurs="0" />
  <xs:element name="requestIdentifier" type="m2m:requestID" />
  <xs:element name="resultExpirationTimestamp" type="m2m:timestamp" minOccurs="0" />
  <xs:element name="to" type="xs:anyURI" minOccurs="0" />
  <xs:element name="responseStatusCode" type="m2m:responseStatusCode" />
 </xs:sequence>
</xs:complexType>
```

METHOD AND APPARATUS FOR RECEIVING RESPONSE INFORMATION IN M2M SYSTEM

CROSS REFERENCE TO RELATED APPLICATIONS

This application is a National Stage Patent Application of PCT International Patent Application No. PCT/KR2016/007326 (filed on Jul. 6, 2016) under 35 U.S.C. §371, which claims priority to Korean Patent Application Nos. 10-2015-0097960 (filed on Jul. 9, 2015), 10-2015-0107329 (filed on Jul. 29, 2015), and 10-2016-0085554 (filed on Jul. 6, 2016), the teachings of which are incorporated herein in their entireties by reference.

TECHNICAL FIELD

The present embodiment relates to a Machine-to-Machine communication (M2M) technology and relates to a procedure for receiving response information in response to a request message in an M2M system.

BACKGROUND ART

Machine-to-Machine communication (M2M) refers to communication between two devices without human intervention. M2M may be also referred to as Machine-Type Communication (MTC), Smart Device Communication, Machine-Oriented Communication, or Internet of Things. Recently, there have been many discussions in one M2M. However, one M2M has not defined technical elements that satisfy the architecture and requirements created by one M2M.

In M2M, human does not directly control communication and application. Accordingly, it is necessary to have methods and procedures for transmission and reception to exchange messages between machines. In addition, a procedure for transmitting or receiving response information may be different for each M2M device or for each request message. However, there is no specific procedure defined or introduced for controlling an M2M device to transmit a request message to receive response information depending on the different transmission and reception procedure. Accordingly, in transmitting and receiving information between M2M devices having different message transmission and reception procedures, an error may occur due to the different procedures.

DETAILED DESCRIPTION OF THE INVENTION

Technical Problem

Therefore, the present embodiment has been made in view of the above-mentioned problems and is to propose a method and an apparatus enabling an M2M device to separate a procedure for transmitting a request message from a procedure for receiving response information in response to the request message, thereby preventing an error.

Further, the present embodiment is to propose a method and an apparatus enabling an M2M device to perform a procedure for receiving response information differently according to a response type parameter included in a request message.

Technical Solution

To solve the foregoing problems, one embodiment provides a method for receiving, by a Machine-to-Machine communication (M2M) device, response information, the method including: transmitting a request message; checking a response type parameter corresponding to the request message; and receiving response information depending on the response type parameter, wherein the response type parameter is set to at least one of blocking, synchronous non-blocking (nonBlockingRequestSynch), and asynchronous non-blocking (nonBlockingRequestAsynch).

Further, one embodiment provides a Machine-to-Machine communication (M2M) device for receiving response information, the M2M device including: a transmitter configured to transmit a request message; a controller configured to check a response type parameter corresponding to the request message; and a receiver configured to receive response information depending on the response type parameter, wherein the response type parameter is set to at least one of blocking, synchronous non-blocking (nonBlockingRequestSynch), and asynchronous non-blocking (nonBlockingRequestAsynch).

Advantageous Effects

As described above, according to the present embodiment a request message from a transmitter essential for machine communication may be processed without errors.

Further, according to the present embodiment, an M2M device is able to perform a procedure for receiving response information differently depending on a response type parameter included in a request message, thereby processing all resources in all devices having different procedures for transmitting and receiving response information without errors.

BRIEF DESCRIPTION OF THE DRAWINGS

FIG. 6 illustrates content parameter information according to an embodiment;

FIG. 7 illustrates attribute information "operationResult" according to an embodiment;

MODE FOR CARRYING OUT THE INVENTION

Figure 1:
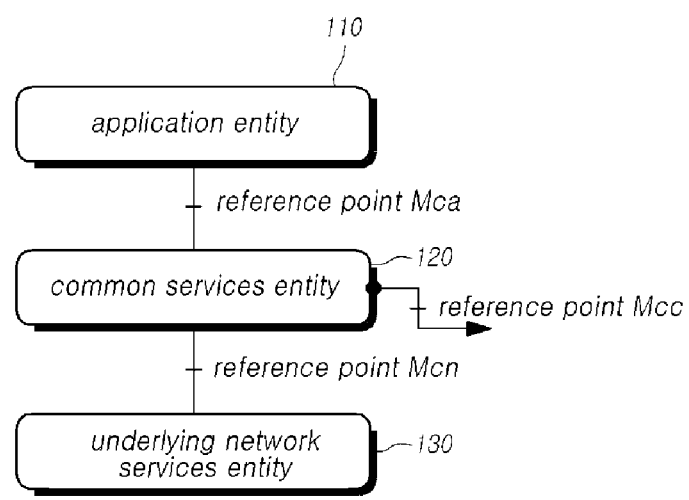
FIG. 1 illustrates an M2M system from a high level functional perspective.

Hereinafter, exemplary embodiments of the present disclosure will be described with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. If a component is described as 'connected', 'coupled', or 'linked' to another component, one of ordinary skill in the art would understand the components are not necessarily directly 'connected', 'coupled', or 'linked' but also are indirectly 'connected', 'coupled', or 'linked' via a third component.

Embodiments of the present disclosure will be described with machine communication. Machine communication may be referred to as various terms, such as Machine-to-Machine communication (M2M), Machine-Type Communication (MTC), Internet of Things (IoT), Smart Device Communication (SDC), or Machine-Oriented Communication. Recently, one M2M has presented various technical requirements related to machine communication. Machine communication refers to various types of communications in which communication is performed without human intervention. Machine communication is divided into different fields, such as energy, enterprise, healthcare, public services, residence, retail, transportation, and others. Embodiments of the present disclosure may be applicable to the above-mentioned fields, and are also applicable to other fields.

FIG. 1 illustrates an M2M system from higher level functional perspective according to an embodiment.

An Application Entity (AE) 110 provides application logic for an end-to-end M2M solution. For example, the AE may be a fleet-tracking application such as a vehicle-tracking application, a remote blood sugar-monitoring application, or a remote power-metering and controlling application. A Common Services Entity (CSE) 120 is a set of service functions, and these service functions are commonly used in an M2M environment. The service functions are exposed as different functions through reference points Mca and Mcc and use an underlying network service using a reference point Mcn. For example, the service functions may be data management, device management, M2M subscription management, location service, and the like. A subfunction provided by the CSE may be logically understood as a Common Service Function (CSF). Some of the CSFs in the CSE of a one M2M node are mandatory, and some may be optional. Likewise, subfunctions in the CSF may also be mandatory or optional.

An Underlying Network Services Function (NSF) 130 provides services to the CSE. For example, the services include device management, location services, and device triggering.

Reference points are supported by the CSE. For example, a reference point Mca is a reference point that indicates communication flow between the AE and the CSE. A reference point Mcc is a reference point that indicates communication flow between two CSEs. A reference point Mcn is a reference point that indicates communication flow between the CSE and one network service entity.

More specifically, the reference point Mca allows one AE to use a service supported by the CSE. Services provided through the reference point Mca are dependent on a function provided by the CSE, and the AE and the CSE may reside in the same physical entity or in different physical entities. The reference point Mcc enables a CSE, which wishes to use a service from another CSE providing a necessary function, to use the service. Services provided through the reference point Mcc are dependent on a function provided by the CSE. The reference point Mcc may be supported between different M2M nodes. The reference point Mcn enables a CSE, which wishes to use an underlying network service entity providing a necessary function, to use the underlying network service entity, and provides services other than transport and connectivity services. An instance of the reference point Mcn is implemented depending on a service provided by an underlying network. The exchange of information between two physical M2M nodes may use transport and connectivity services of the underlying network that provides underlying services.

In the present specification, a common service entity may be represented by a CSE, and a network service entity may be represented by an NSE. Further, in the present specification, an M2M device may refer to a CSE, an AE, or a device including a CSE or an AE.

Figure 2:
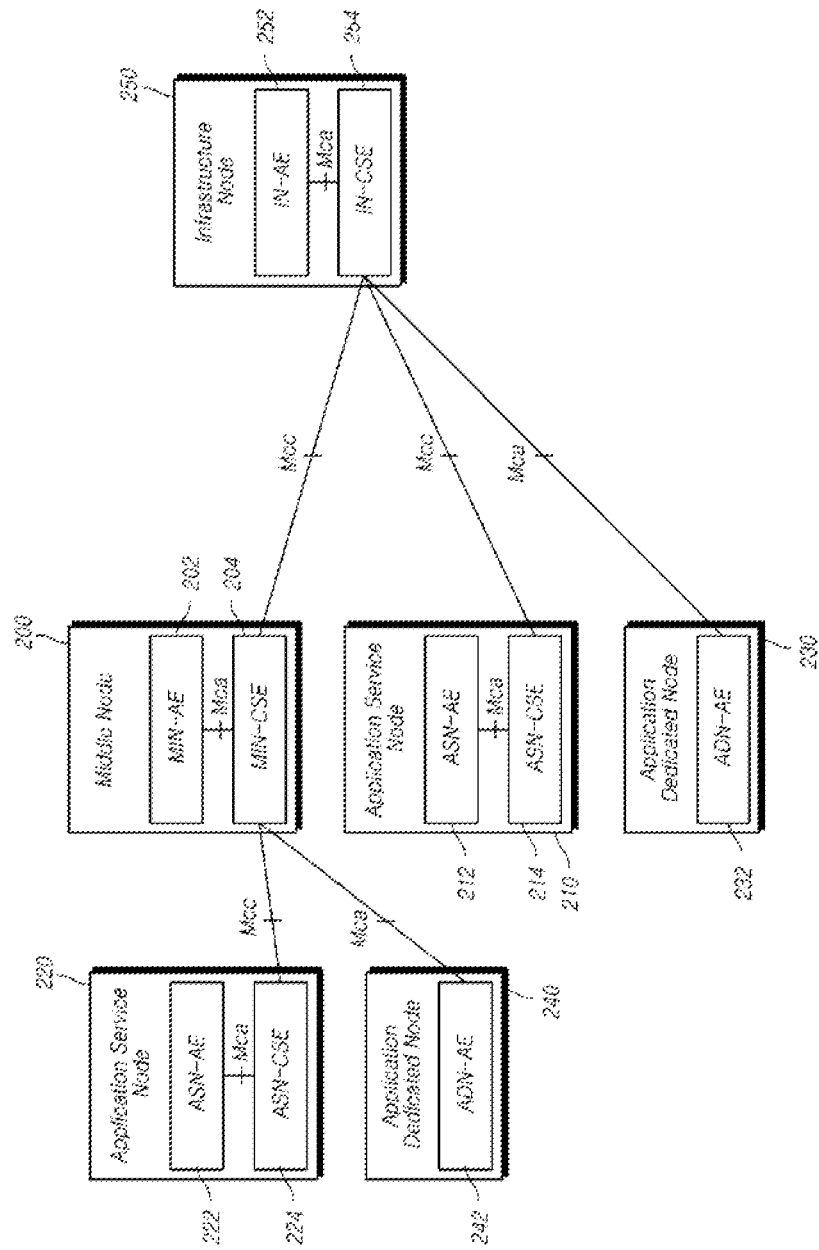
FIG. 2 illustrates configuration of an M2M system according to an embodiment.

FIG. 2 illustrates configuration of an M2M system according to an embodiment.

Referring to FIG. 2, an infrastructure node 250 performs a server function necessary to provide M2M communication. The infrastructure node 250 includes an infrastructure node Application Entity (AE) 252 and an infrastructure node Common Service Entity (CSE) 254. The infrastructure node CSE 254 is configured using resources shown in FIG. 3. The infrastructure node AE 252 and the infrastructure node CSE 254 are divided by a reference point Mca and are used to configure and process a request message and a response message for creating, deleting, updating, retrieving, and reporting a message necessary for M2M communication, particularly, a scheduler resource.

A middle node 200 relays M2M communication, Internet of Things, or machine communication functions between an application service node 220 and the infrastructure node 250. The middle node 200 includes a middle node AE 202 and a middle node CSE 204. The middle node CSE 204 is configured using the resources shown in FIG. 3. The middle node AE 202 and the middle node CSE 204 are divided by a reference point Mca. The infrastructure node CSE 254 and the middle node CSE 204 are divided by a reference point Mcc. The middle node AE 202 and the middle node CSE 204 are used to configure and process a request message and a response message for creating, deleting, updating, retrieving, and reporting a message necessary for M2M communication, particularly, a scheduler resource.

An application service node 210 may include an AE 212 and a CSE 214. The AE 212 processes an application functions required for the purpose of a device. The CSE 214 of the application service node 210 is configured using the resources shown in FIG. 3. The application service node AE 212 and the application service node CSE 214 are divided by a reference point Mca, and the application service node CSE 214 and the infrastructure node CSE 254 are divided by a reference point Mcc. The application service node AE 212 and the application service node CSE 214 are used to configure and process a request message and a response message for creating, deleting, updating, retrieving, and reporting a message necessary for M2M communication, particularly, a scheduler resource. Meanwhile, the application service node 220 may perform a machine communication function with the infrastructure node 250 through the middle node 200. The difference between the application service nodes 210 and 220 is that the nodes include different communication interfaces. For example, the application service node 220 communicates with the infrastructure node 250 through the middle node 200 using an interface enabling ultra-short-range communication, such as a Bluetooth, ZigBee, Z-wave, or Wi-Fi interface. On the other hand, the application service node 210 communicates with the infrastructure node 250 using a communication interface, such as a 3G, LTE, Ethernet, Gigabit Ethernet, or ADSL interface.

Application-dedicated nodes 230 and 240 have only an AE 242 without a CSE and perform machine communication. The Application-dedicated node 230 communicates with the infrastructure node 250 through a communication interface, such as a 3G, LTE, Ethernet, Gigabit Ethernet, or ADSL interface, and the application dedicated node 240 communicates with the infrastructure node 250 through the middle node 200 using an interface enabling ultra-short-range communication, such as a Bluetooth, ZigBee, Z-wave, or Wi-Fi interface.

As described in FIG. 2, the M2M system may include at least one or more of an infrastructure node, a middle node, an application service node, and an application-dedicated node, and each node may be configured to include a CSE or an AE. ACSE and an AE can communicate with other CSEs or AEs through respective reference points.

The present embodiments relate to a method and a procedure for a request message transmitter to receive response information in an M2M system, which is essential for preventing the occurrence of an error.

For example, houses or apartments use machine communication to monthly or periodically provide usage information on electricity, gas, water, or the like. To this end, information needs to be collected and transmitted by electricity meters, gas meters, and water meters. In addition, machine communication may be applied to various areas, such as energy, enterprise, medical, public service, residential, retail, traffic, and transportation, and various machine communication applications may be presented in Table 1, without being limited thereto.

TABLE 1

| Vertical | Use case |
|---|---|
| Energy Use Case | Wide area Energy related measurement/control system for advanced transmission and distribution automation<br>Analytics Use Case for M2M<br>Smart Meter Reading<br>Environmental Monitoring of Remote Locations to Determine Hydropower<br>Oil and Gas Pipeline Cellular/Satellite Gateway |
| Enterprise Use Cases | Smart Building |
| Healthcare Use Cases | M2M Healthcare Gateway<br>Use Case on Wellness Services<br>Secure remote patient care and monitoring |
| Public Services Use Cases | Street Light Automation<br>Use Case on Devices, Virtual Devices and Things<br>Car/Bicycle Sharing Services<br>Smart Parking<br>Information Delivery service in the devastated area |
| Residential Use Cases | Home Energy Management<br>Home Energy Management System (HEMS)<br>Plug-in Electrical Charging Vehicles and power feed in home scenario<br>Real-time Audio/Video Communication<br>Event Triggered Task Execution Use Case<br>Semantic Home Control<br>Semantic Device Plug and Play<br>Triggering in the Field Domain |
| Retail Use Cases | Vending Machines |
| Transportation Use Cases | An industrial use case for on-demand data collection for factories |

TABLE 1-continued

| Vertical | Use case |
|---|---|
| Other Use Cases | Extending the M2M Access Network using Satellites<br>M2M Data Traffic Management by Underlying Network Operator<br>Optimized M2M interworking with mobile networks (Optimizing connectivity management parameters)<br>Sleepy Mode Use Case<br>Use Case on collection of M2M System data<br>Leveraging Broadcasting/Multicasting Capabilities of Underlying Networks<br>Leveraging Service Provisioning for Equipment with Built-in M2M Device<br>Semantics query for device discovery across M2M Service Providers<br>Underlying network service activation and deactivation<br>An industrial use case for on-demand data collection for factories |

The present embodiment provides a separate procedure for receiving response information depending on the response type of an individual M2M device or an individual request message in transmitting and receiving information between M2M devices in various fields, thereby preventing the occurrence of an error that may occur in transmitting and receiving response information.

To this end, the present embodiment provides a method of an originator for generating and transmitting a request message and determining whether a response type parameter is blocking, synchronous non-blocking, or asynchronous non-blocking according to the type of a response from a receiver. In addition, when the response type parameter is synchronous non-blocking, the originator may check an operation result of the receiver, determine whether the processing has been completed, and obtain the result of processing completion. When the response type parameter is asynchronous non-blocking, the originator may receive operation result completion notification information from the receiver and obtain the result of processing completion using the notification information.

In the present specification, both the originator and the receiver may be M2M devices, wherein an M2M device that transmits a request message is referred to as an originator and an M2M device that receives a request message, and generates and transmits response information is referred to as a receiver.

Figure 3:
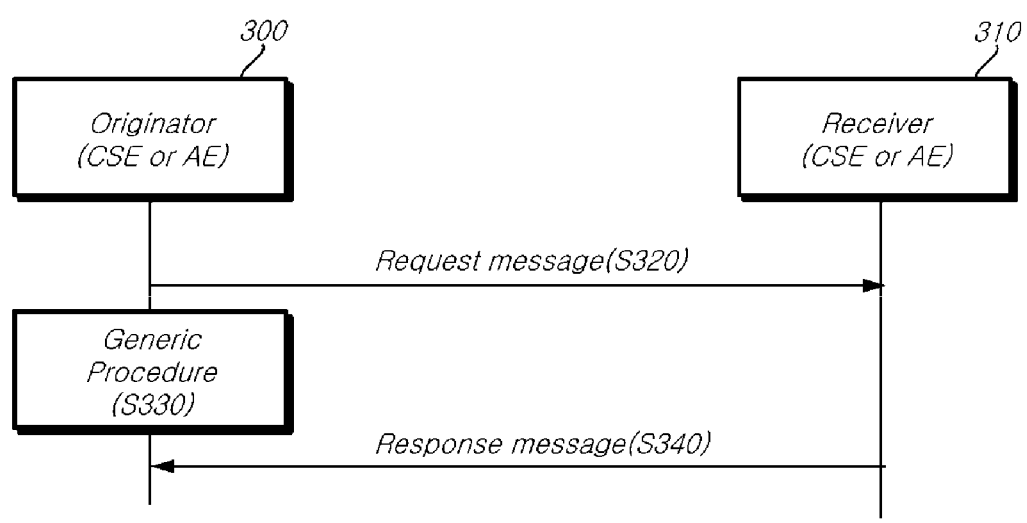
FIG. 3 illustrates a procedure for transmitting a request message and receiving response information in response to the request message in an M2M system.

FIG. 3 illustrates a procedure for transmitting a request message and receiving response information in response to the request message in an M2M system.

Referring to FIG. 3, an originator 300 transmits a request message to obtain necessary information (S320). The request message may include a mandatory parameter and an optional parameter. For example, a transmitter parameter, a receiver parameter, a request identification parameter, and an operation parameter are included as mandatory parameters. The transmitter parameter includes information about an originator that transmits a message, and the receiver parameter includes information about a receiver that receives a message. The request identification parameter includes unique ID information for identifying the corresponding request message. The operation parameter includes information for distinguishing a requested operation from the request message. The operation parameter may be set to at least one of creation, retrieval, deletion, update, and notification.

A receiver 310 receives the request message, generates a response message for the request message, and transmits the response message to the originator 300 (S340). However, the receiver 310 may have different procedures for transmitting a response message depending on the configuration. Alternatively, the response message may be received in a different procedure depending on a response type parameter included in the request message. That is, a procedure for the receiver 310 to transmit the response message after receiving the request message by the receiver 310 may vary.

Accordingly, the originator 300 performs a generic procedure for receiving a response message according to the response message processing procedure of the individual receiver 310 (S330). For example, the originator 300 may check the response type parameter of the request message and receive the response message using a different procedure for each response type parameter. The present disclosure relates to a response message reception procedure of the originator 300 and proposes a response information reception procedure classified by response type parameters.

Hereinafter, step S330 is described with reference to a specific embodiment, and a separate response information reception procedure depending on the response type parameter is described.

Figure 4:
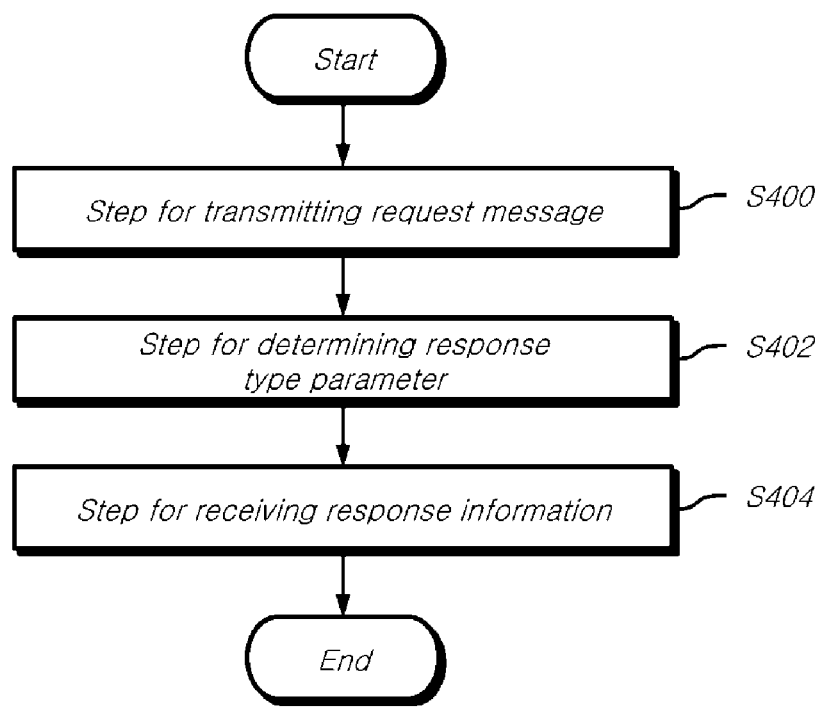
FIG. 4 illustrates an operation for receiving response information by an M2M device according to an embodiment.

FIG. 4 illustrates an operation of an M2M device for receiving response information according to an embodiment.

Referring to FIG. 4, the M2M device transmits a request message (S400). The request message may include at least one of an operation parameter, a receiver parameter, a transmitter parameter, and a request identification parameter.

The M2M device checks a response type parameter corresponding to the request message (S402). For example, the response type parameter may be included in the request message. The response type parameter may be set separately according to the procedure for receiving response information relating to the request message. For example, the response type parameter may be set to at least one of blocking, synchronous non-blocking (nonBlockingRequestSynch), and asynchronous non-blocking (nonBlockingRequestAsynch). Alternatively, there may be no response type parameter.

The M2M device receives response information according to the response type parameter (S404). The M2M device may receive the response information relating to the request message through a different procedure depending on the response type parameter checked in step S402.

For one example, when there is no response type parameter or when the response type parameter is set to blocking, the M2M device waits to receive response information. That is, the M2M device waits to receive a response message including response information without performing any operation.

For another example, when the response type parameter is set to one of synchronous non-blocking and asynchronous non-blocking, the M2M device waits to receive an acknowledgment message in response to the request message from a receiver. The acknowledgment message may include ACK information relating to the request message and include information indicating that the receiver has received the request message.

For still another example, when the response type parameter is set to synchronous non-blocking, the M2M device transmits a retrieval request message for receiving response information to the receiver. The retrieval request message may be transmitted when a preset period or predetermined time has passed. The M2M device receives a retrieval response message in response to the retrieval request message after transmitting the retrieval request message. The retrieval response message may essentially include a response status code parameter, a request identification parameter, and a content parameter. When the retrieval response message is received, the M2M device may check the response status code parameter or the content parameter included in the retrieval response message, retransmit a retrieval request message, extract response information from the retrieval response message, or perform error processing depending on whether the response information is included.

For yet another example, when the response type parameter is set to asynchronous non-blocking, the M2M device may receive a notification request message from the receiver. The M2M device generates a notification response message in response to the notification request message and transmits the notification response message to the receiver. The notification request message may include an operation parameter, a receiver parameter, a transmitter parameter, a request identification parameter, and a content parameter. The notification response message may include a response status code parameter and a request identification parameter. The request identification parameter included in the notification response message may be set to have the same value as that of the request identification parameter of the notification request message. The notification request message is used when the receiver completes the generation of response information in response to the request message and transmits the response information to the M2M device. The M2M device may extract the response information from the notification request message, thereby obtaining the response information.

In summary, the M2M device may wait to receive the response information, receive the response information by periodically transmitting the retrieval request message, or receive the notification request message to extract the response information, depending on the response type parameter. These procedures for receiving response information are classified according to the response type parameter, and the M2M device may check a response type parameter and perform a separate procedure in transmitting a request message.

Hereinafter, the foregoing response information reception procedure of the M2M device will be described with reference to two separate embodiments, in each of which some steps may be omitted or added. Alternatively, the embodiments may be performed independently or in combination, and some steps in the embodiments may be performed in combination.

First Embodiment

Figure 5:
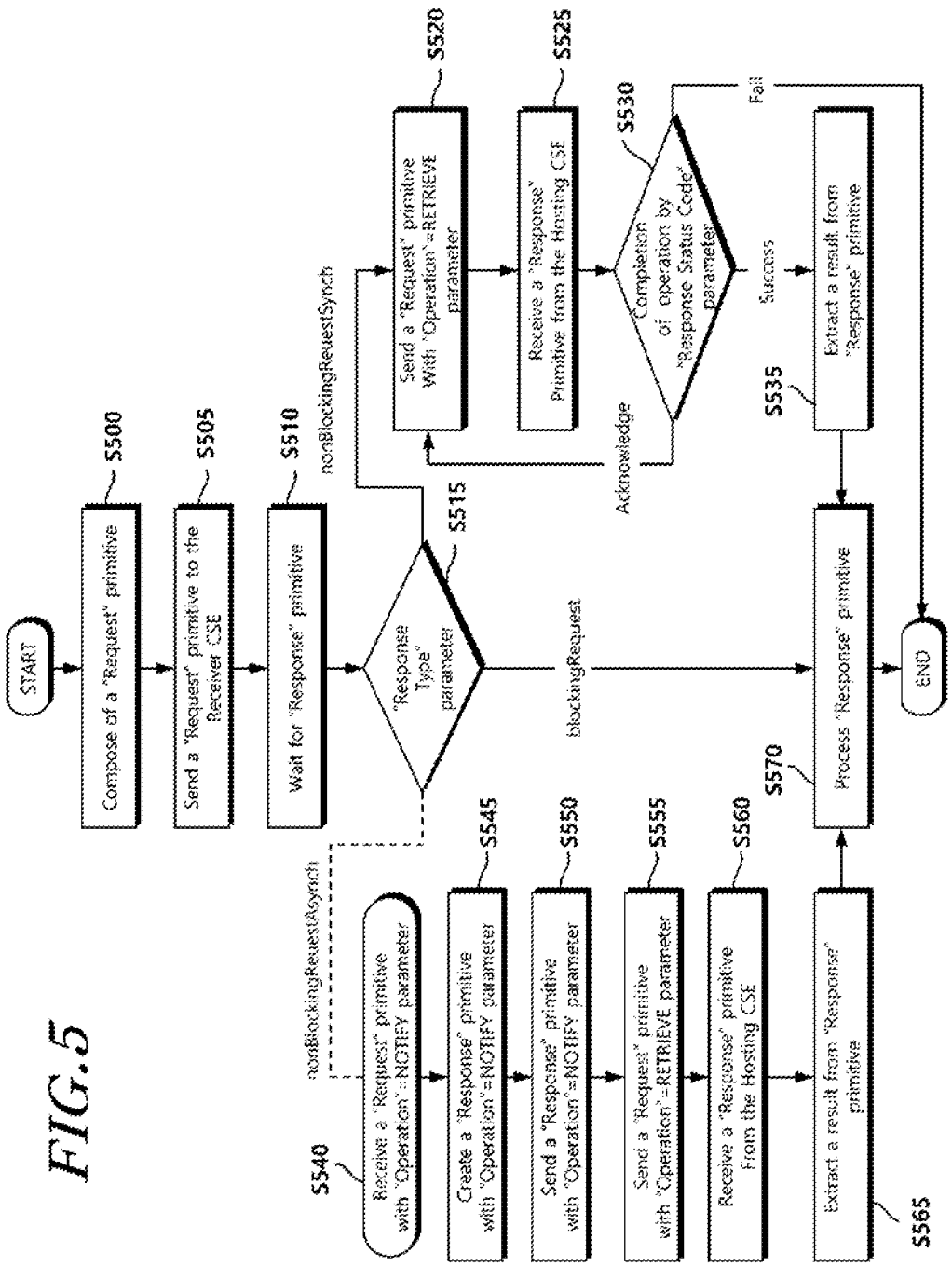
FIG. 5 illustrates an operation for receiving response information according to a first embodiment.

FIG. 5 illustrates an operation for receiving response information according to a first embodiment.

Referring to FIG. 5, in performing communication, an M2M device generates a request message (S500). The request message essentially includes an Operation parameter, a Receiver (To) parameter, an Originator (From) parameter, a Request Identifier parameter, and the like.

The Operation parameter indicates information on an operation to be performed by a receiver, such as creation, retrieval, update (renewal), deletion, and notification. For example, when the Operation parameter is information indicating the creation of a schedule, the request message includes a Content parameter and a Response Type parameter. For another example, when the Operation parameter is information indicating update or notification, the request message includes a Content parameter. For still another example, when the Operation parameter is information indicating retrieval, the request message may include a Content parameter. The Receiver (To) parameter indicates an AE or a CSE that receives the request message. The Originator (From) parameter indicates an AE or a CSE that generates and transmits the request message. The Request Identifier parameter is information for uniquely identifying the request message.

The M2M device transmits the request message constructed in step S500 to the receiver (S505). The request message essentially includes the Operation parameter, the Receiver (To) parameter, the Originator (From) parameter, the Request Identifier parameter, and the like.

The M2M device waits for a response message from the receiver (S510). The response message essentially includes a "Response Status Code" parameter and a "Request Identifier" parameter. Information on the "Request Identifier" parameter needs to be the same as the "Request Identifier" parameter in step S505.

After receiving the response message, the M2M device checks information on the Response Type parameter (S515). The Response Type parameter is represented by at least one of blocking (blockingRequest), synchronous non-blocking (nonBlockingRequestSynch), and asynchronous non-blocking (nonBlockingRequestAsynch).

For example, when the information on the Response Type parameter is blocking (BlockingRequest), the M2M device processes the response message (S570).

For another example, when the information on the Response Type parameter is synchronous non-blocking blocking (nonBlockingRequestSynch), the M2M device receives an acknowledgment message from the receiver. This is a way of indicating that the receiver is processing the request message from the M2M device when the receiver cannot immediately process the request message or when there is any reason and is applied when only the M2M device can start communication. The M2M device transmits a retrieval request message after a certain period of time or arbitrary time in order to identify whether the receiver has completely processed the request message (S520). For example, the retrieval request message essentially includes "Operation", "To", "From", and "Request Identifier" parameters. The Operation parameter is set to Retrieve.

The M2M device receives a retrieval response message from the receiver in response to the retrieval request message (S525). When the receiver has processed the request message of step S505, the retrieval response message from the receiver essentially includes "Response Status Code", "Request Identifier", and "Content" parameters. Information on the "Request Identifier" parameter needs to be the same as that of the "Request Identifier" of the retrieval request message. Information on the "Content" parameter includes response information when the receiver has processed the request message of step S505. When the receiver failed to process the request message of step S505, the response message from the receiver essentially includes "Response Status Code" and "Request Identifier" parameters.

The M2M device checks the "Response Status Code" parameter in the retrieval response message (S530). When information on the "Response Status Code" parameter is Successful (e.g., code 2XXX), the M2M device checks the Content parameter. When there is the Content parameter, the M2M device determines Success and performs step S535. For example, when a code of the Response Status parameter is 2000 (OK), 2001 (created), 2002 (deleted), or 2004 (changed) and the Content parameter is present, the M2M device performs step S535.

When the information on the "Response Status Code" parameter indicates that the receiver has not completed processing (e.g., Informational (1XXX) or Acknowledge), the M2M device performs step S520. That is, the M2M device may retransmit a retrieval request message after a certain period of time or at particular time.

When the information on the "Response Status Code" parameter is Failed, the M2M device determines that an error has occurred and terminates the process. For example, when the Response Status Code parameter indicates an originator error (4,004 a receiver error (5,004 or a network error (6,004 the M2M device determines that an error has occurred. When the response status code is 2XXX but there is no Content parameter, the M2M device determines that an error has occurred.

The M2M device extracts an operation result of a response from the receiver using the retrieval response message. For example, the operation result may be included in "operation result" attribute information of a <request> resource in the "Content" parameter. The <request> resource needs to include mandatory attribute information. The mandatory attribute information is information on operation, target, originator, request ID, meta Information, content, request Status, and operation Result attributes. FIG. 6 illustrates an example of the <request> resource in the "Content" parameter according to the present disclosure. FIG. 7 illustrates an example of the "operation Result" attribute information according to the present disclosure, wherein information on the "Request Identifier" parameter in "operation result" needs to be the same as that of the "Request Identifier" of step S505.

For still another example, when the Response Type parameter included in the request message is asynchronous non-blocking (nonBlockingRequestAsynch), the M2M device receives an acknowledgment message from the receiver. This is a way of indicating that the receiver is processing the request message from the M2M device when the receiver cannot immediately process the request message or when there is any reason and is applied when the M2M device or the receiver can start communication.

When the receiver completes processing the request message, the receiver transmits a notification request message to the M2M device, and the M2M device receives the notification request message (S540). The notification request message received by the M2M device includes "Operation", "To", "From", "Request Identifier", and "Content" parameters. The Operation parameter is set to Notify. The Content parameter in the notification request message may include URI information indicating an operation result.

The M2M device generates a notification response message in response to the notification request message (S545). The notification response message essentially includes "Response Status Code" and "Request Identifier" parameters. Information on the "Request Identifier" parameter included in the notification response message needs to be the same as "Request Identifier" in the notification request message.

The M2M device transmits the generated notification response message to the receiver (S550). Information on a "To" parameter included in the notification response message needs to be the same as information on the "To" parameter of step S505.

The M2M device transmits a retrieval request message for retrieving the "Content" parameter of the notification request message (S555). The retrieval request message of step S555 essentially includes "Operation", "To", "From", and "Request Identifier" parameters. The Operation parameter is set to Retrieve.

The M2M device receives a retrieval response message from a hosting CSE (S560). The retrieval response message of step S560 essentially includes "Response Status Code", "Request Identifier", and "Content" parameters. Information on the "Request Identifier" parameter of step S560 needs to be the same as the "Request Identifier" of S555. Information on the "Content" parameter included in the retrieval response message includes operation result information on the request message of step S505. As described above, the information on the "Content" parameter may be configured as shown in FIG. 6.

The M2M device extracts an operation result of the retrieval response message received in step S560 (S565). The operation result is "operation result" attribute information of a <request> resource in the "Content" parameter. The <request> resource needs to include mandatory attribute information. The mandatory attribute information is information on operation, target, originator, request ID, meta Information, content, request Status, and operation Result attributes. The operation result (operation Result) of the <request> resource in step S560 includes response information relating to the request message of step S505. As described above, the "operation Result" attribute information may be configured as shown in FIG. 7.

The M2M device processes a request result relating to the request message of step S505 using the extracted response information (S570). Information on a "Request Identifier" parameter in step S570 needs to be the same as the "Request Identifier" in step S505.

Second Embodiment

Figure 8:
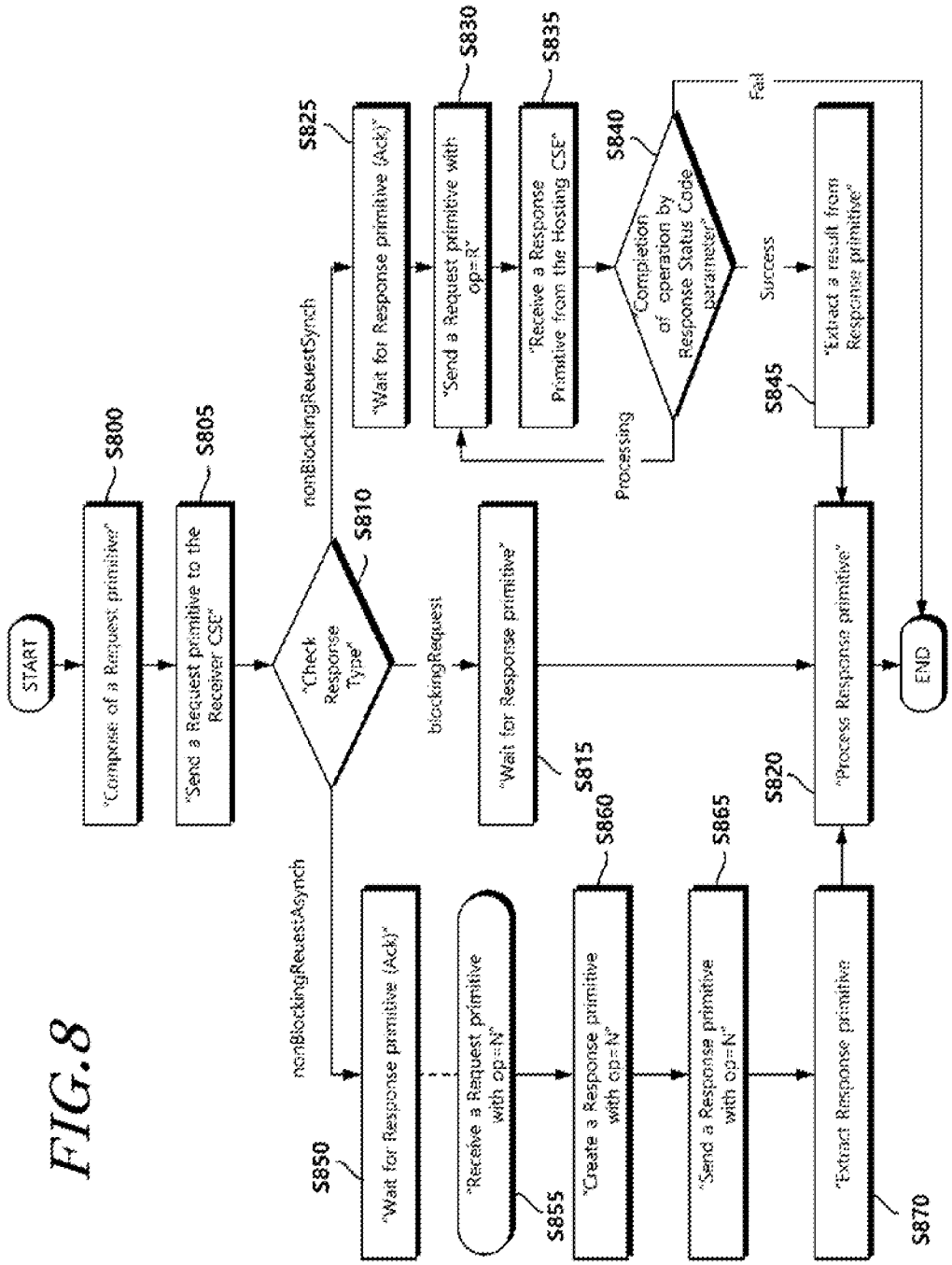
FIG. 8 illustrates an operation for receiving response information according to a second embodiment.

FIG. 8 illustrates an operation for receiving response information according to a second embodiment.

Referring to FIG. 8, an M2M device generates a request message (S800). The request message essentially includes an Operation parameter, a Receiver (To) parameter, an Originator (From) parameter, a Request Identifier parameter, and the like.

The M2M device transmits the generated request message to a receiver (S805).

Subsequently, the M2M device checks a Response Type parameter in the request message (S810), instead of receiving a response message as in the first embodiment. As described above, there may be no Response Type parameter, or the Response Type parameter may be set to at least one of blocking, synchronous non-blocking, and asynchronous non-blocking.

For example, when there is no Response Type parameter in the request parameter or when the Response Type parameter is blocking, the M2M device waits for a response message from the receiver (S815). The response message essentially includes a "Response Status Code" parameter and a "Request Identifier" parameter and includes response information relating to the request message. Information on the "Request Identifier" parameter in the response message is the same as "Request Identifier" of step S805. When information on the Response Type parameter is blocking (blockingRequest), the M2M device processes the response information from the receiver (S820).

For another example, when the information on the Response Type parameter is synchronous non-blocking blocking (nonBlockingRequestSynch), the M2M device waits for an acknowledgment message from the receiver (S825). Upon receiving the request message, the receiver may transmit the acknowledgment message of the request message to the M2M device.

The M2M device transmits a retrieval request message after a certain period of time or arbitrary time in order to identify whether the request message has been completely processed (S830). The certain period of time or the arbitrary time may be preset or may be dynamically set corresponding to the request message. Alternatively, the retrieval request message may be periodically transmitted. Here, the M2M device may or may not manage the state of a process in order to perform step S830. For example, an instance of not managing the state of a process in S825 in order to perform step S830 is indicated by a dotted line. Further, an instance of managing the state of a process is indicated by a solid line. The retrieval request message essentially includes "Operation", "To", "From", and "Request Identifier" parameters. The Operation parameter is set to Retrieve.

Subsequently, the M2M device receives a retrieval response message in response to the retrieval request message (S835). When the receiver has processed the request message transmitted in step S805, the retrieval response message essentially includes "Response Status Code", "Request Identifier", and "Content" parameters. Information on the "Request Identifier" parameter in the retrieval response message is the same as that of the "Request Identifier" parameter of the retrieval request message. Information on the "Content" parameter includes response information in response to the request message of step S805 when the receiver has processed the request message. When the receiver failed to process the request message of step S805, the retrieval response message essentially includes "Response Status Code" and "Request Identifier" parameters.

The M2M device checks the "Response Status Code" parameter in the retrieval response message (S840). For example, when information on the "Response Status Code" parameter is Successful (e.g., code 2XXX), the M2M device checks the Content parameter. When there is the Content parameter, the M2M device performs operations of step S845. That is, when the response status code is one of 2000 (OK), 2001 (created), 2002 (deleted), and 2004 (changed) and the Content parameter is present, the M2M device performs operations of step S845. For another example, when the information on the "Response Status Code" parameter is information indicating that the receiver needs to continue processing, the M2M device performs operations of step S830. That is, when the response status code is 1XXX, the M2M device retransmits a retrieval request message after a certain period of time or arbitrary time. For still another example, when the information on the "Response Status Code" parameter is one of an originator error (4,004 a receiver error (SXXX), a network error (6,004 and 2XXX and there is no Content parameter, the M2M device determines that an error has occurred and terminates the process.

When it is determined that response information is included as a result of checking the Response Status Code parameter and the Content parameter in step S840, the M2M device extracts the response information from the retrieval response message. The response information may be included in "operation result" attribute information of a <request> resource in the "Content" parameter. The <request> resource needs to include mandatory attribute information. The mandatory attribute information is information on operation, target, originator, request ID, meta Information, content, request Status, and operation Result attributes. As described above, the <request> resource in the "Content" parameter may be configured as in FIG. 6. Further, the "operation Result" attribute information may be configured as in FIG. 7. Information on the "Request Identifier" parameter included in the "operation result" attribute information is the same as that of the "Request Identifier" of step S805.

For still another example, when the Response Type parameter included in the request message is asynchronous non-blocking (nonBlockingRequestAsynch), the M2M device waits for an acknowledgment message from the receiver (S850). When the receiver has checked the request message, the M2M device receives an acknowledgment message. In the asynchronous non-blocking (nonBlockingRequestAsynch) mode, a dotted line indicates that the M2M device does not manage the state of a process in step S850 in order to perform operations of step S855. Further, a sloid line indicates managing the state of a process. The M2M device may or may not manage the state of a process in step S850 in order to perform step S855. FIG. 8 shows that the M2M device does not manage the state of a process.

When the receiver completes processing the request message, the receiver transmits a notification request message to the M2M device, and the M2M device receives the notification request message (S855). The notification request message received by the M2M device includes "Operation", "To", "From", "Request Identifier", and "Content" parameters. The Operation parameter is set to Notify. The content of the notification (e.g., content) may include the response information in response to the request message transmitted in step S805.

The M2M device generates a notification response message in response to the notification request message (S860). The notification response message essentially includes "Response Status Code" and "Request Identifier" parameters. Information on the "Request Identifier" parameter included in the notification response message needs to be the same as "Request Identifier" in the notification request message.

The M2M device transmits the generated notification response message to the receiver (S865). Information on a "To" parameter included in the notification response message needs to be the same as information on the "To" parameter of step S805.

The M2M device extracts the response information included in the notification request message received in step S855 (S870). The response information may be included in "operation result" attribute information of a <request> resource in the "Content" parameter. The <request> resource needs to include mandatory attribute information. The mandatory attribute information is information on operation, target, originator, request ID, meta Information, content, request Status, and operation Result attributes. The operation result (operation Result) included in the <request> resource of the notification request message is the response information in response to the request message. For example, the "operation Result" attribute information may be configured as shown in FIG. 6.

Subsequently, the M2M device processes a result relating to the request message using the extracted response information (S820). Information on a "Request Identifier" parameter in step S820 needs to be the same as the "Request Identifier" in step S805.

As described above, according to the present embodiments, a request message from a transmitter essential for machine communication is processed without errors. Further, according to the present embodiments, an M2M device is able to perform a procedure for receiving response information differently depending on a response type parameter included in a request message, thereby processing all resources in all devices having different procedures for transmitting and receiving response information without errors.

Hereinafter, an M2M device capable of performing the above operations according to embodiments will be briefly described again with reference to a drawing.

Figure 9:
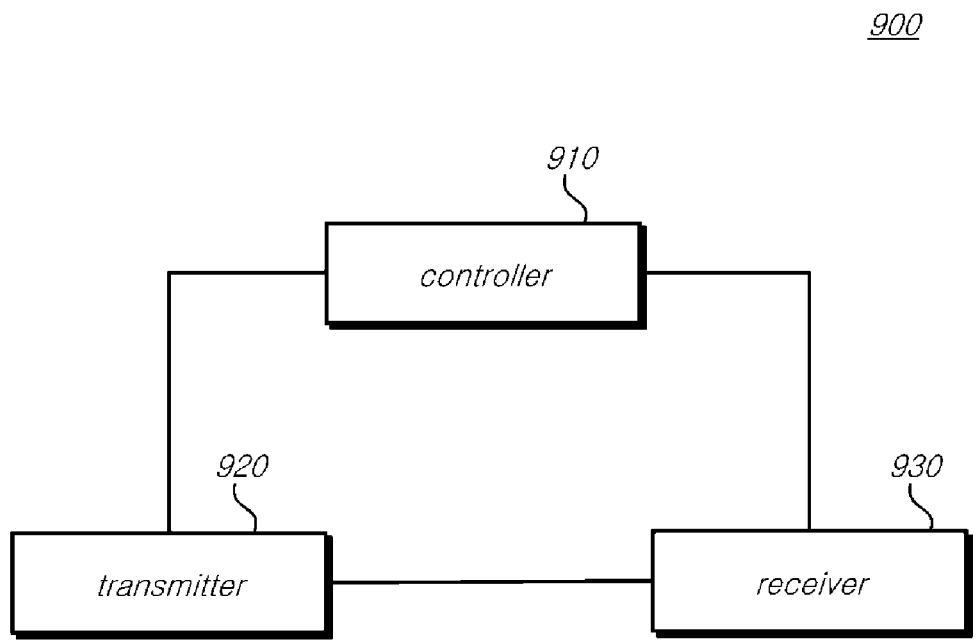
FIG. 9 schematically illustrates an M2M device according to an embodiment.

FIG. 9 schematically illustrates an M2M device according to an embodiment.

Referring to FIG. 9, the M2M device 900 may include a transmitter 920, a controller 910, and a receiver 930. The transmitter 920 transmits a request message. The controller 910 checks a response type parameter corresponding to the request message, and the receiver 930 receives response information depending on the response type parameter. The response type parameter may be set to one of blocking, synchronous non-blocking (nonBlockingRequestSynch), and asynchronous non-blocking (nonBlockingRequestAsynch).

The controller 910 may perform waiting to receive response information when there is no response type parameter or when the response type parameter is set to blocking. The receiver 930 may further receive an acknowledgement message of the request message when the response type parameter is set to one of synchronous non-blocking and asynchronous non-blocking.

When the response type parameter is set to synchronous non-blocking, the transmitter 920 may further transmit a retrieval request message and the receiver 930 may further receive a retrieval response message in response to the retrieval request message. In addition, the controller 910 may perform at least one of an operation of extracting the response information from the retrieval response message, an operation of retransmitting a retrieval request message, and an operation of processing an error is performed based on a result of checking a response status code parameter and a content parameter included in the retrieval response message.

When the response type parameter is set to asynchronous non-blocking, the receiver 930 may further receive a notification request message including notification information. The controller 910 may generate a notification response message in response to the notification request message and extract the response information from the notification request message. The transmitter 920 may transmit the notification response message.

In addition, the controller 910 may control the overall operation of the M2M device 900 to transmit a request message and to separately manage a response information reception procedure depending on the response type parameter according to the foregoing present embodiments.

The transmitter 920 and the receiver 930 are used to transmit, receive, or deliver signals, messages, or data necessary to perform the foregoing present embodiments.

The present embodiments can be implemented via computer programs. For example, the foregoing individual steps or configurations may be implemented in respective functions using computer program codes. Codes and code segments constituting the corresponding programs can be easily deduced by computer programmers skilled in the art. Further, the written programs are stored in a computer-readable recoding medium (information storage medium), and are read and executed by a computer to implement the present embodiments. The recording medium includes all types of recording media readable by a computer. Therefore, the computer programs implementing the present embodiments and the storage medium including the computer programs should be construed as being included in the scope of the present embodiments.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

The invention claimed is:

1. A method for receiving, by a Machine-to-Machine communication (M2M) device, response information, the method comprising:
   transmitting a request message to a receiving end;
   checking a response type parameter being set to one of synchronous non-blocking (nonBlockingRequestSynch) and asynchronous non-blocking (nonBlockingRequestAsynch) corresponding to the request message;
   receiving response information in case that the response type parameter is set to one of synchronous non-blocking (nonBlockingRequestSynch) and asynchronous non-blocking (nonBlockingRequestAsynch); and
   waiting to receive the response information
   wherein the receiving comprising:
   in case that the response type parameter is set to synchronous non-blocking:
   transmitting a retrieval request message;
   receiving a retrieval response message in response to the retrieval request message;
   performing an operation of processing an error to terminate the processing of the request message in case that a response status code parameter included in the retrieval response message indicates an error processing; and
   performing an operation of processing the error to terminate the processing of the request message in case that the response status code parameter indicates a success processing and a content parameter is not included in the retrieval response message, and
   in case that the response type parameter is set to asynchronous non-blocking:
   receiving a notification request message including notification information;
   generating a notification response message in response to the notification request message; and
   transmitting the notification response message,
   wherein the retrieval response message comprises at least one of the response status code parameter, a request identification parameter, and the content parameter, and
   wherein the notification response message comprises at least one of the response status code parameter and the request identification parameter, and the request identification parameter is set to be the same as a request identification parameter of the notification request message, and
   wherein the request identification parameter comprises information on operation, target, originator, request ID, meta information, content, request status, and operation result attributes.

2. The method as claimed in claim 1, wherein the request message comprises at least one of an operation parameter, a receiver parameter, a transmitter parameter, and a request identification parameter.

3. The method as claimed in claim 1, wherein receiving comprises receiving an acknowledgement message of the request message before receiving the response information in a case where the response type parameter is set to one of synchronous non-blocking and asynchronous non-blocking.

4. The method as claimed in claim 1, wherein the notification request message comprises an operation parameter, a receiver parameter, a transmitter parameter, a request identification parameter, and the content parameter including the notification information.

5. The method as claimed in claim 1, comprising extracting the response information from the notification request message.

6. A Machine-to-Machine communication (M2M) device for receiving response information, the M2M device comprising:
   a transmitter configured to transmit a request message to a receiving end;
   a controller configured to check a response type parameter being set to one of blocking, synchronous non-blocking (nonBlockingRequestSynch) or asynchronous non-blocking (nonBlockingRequestAsynch) corresponding to the request message, perform an operation of receiving response information in case that the response type parameter is set to synchronous non-blocking (nonBlockingRequestSynch) or asynchronous non-blocking (nonBlockingRequestAsynch), and perform an operation of waiting to receive the response information in a case where there is no response type parameter; and
   a receiver configured to receive the response information,
   wherein in case that the response type parameter is set to synchronous non-blocking, the transmitter transmits a retrieval request message, the receiver receives a retrieval response message in response to the retrieval request message, and the controller perform an operation of processing an error to terminate the processing of the request message in case that a response status code parameter included in the retrieval response message indicates an error processing; and perform an operation of processing the error to terminate the processing of the request message in case that the response status code parameter indicates a success processing and a content parameter is not included in the retrieval response message, and
   wherein in case that the response type parameter is set to asynchronous non-blocking, the receiver receives a notification request message including notification information, the controller generates a notification response message in response to the notification request message and extracts the response information from the notification request message, and the transmitter transmits the notification response message, wherein the retrieval response message comprises at least one of the response status code parameter, a request identification parameter, and the content parameter, and wherein the request identification parameter comprises information on operation, target, originator, request ID, meta information, content, request status, and operation result attributes, and wherein the notification response message comprises at least one of the response status code parameter and the request identification parameter, and the request identification parameter is set to be the same as a request identification parameter of the notification request message, and wherein the request identification parameter comprises information on operation, target, originator, request ID, meta information, content, request status, and operation result attributes.

7. The M2M device as claimed in claim 6, wherein the receiver receives an acknowledgement message of the request message in a case where the response type parameter is set to one of synchronous non-blocking and asynchronous non-blocking.

\* \* \* \* \*